Feb. 22, 1966 W. F. HUCK ETAL 3,236,470

METHOD AND APPARATUS FOR SPLICING RUNNING PREPRINTED WEBS IN REGISTER TO PREPRINTED WEB ROLLS

Filed Aug. 9, 1963 6 Sheets-Sheet 1

INVENTORS
WILLIAM F. HUCK
RUDOLF WOLF
BY Albert C. Johnston
ATTORNEY

INVENTORS
WILLIAM F. HUCK
RUDOLF WOLF
BY Albert C. Johnston
ATTORNEY

INVENTORS
WILLIAM F. HUCK
RUDOLF WOLF
BY Albert C. Johnston
ATTORNEY

INVENTORS
WILLIAM F. HUCK
BY RUDOLF WOLF
Albert C. Johnston
ATTORNEY

INVENTORS
WILLIAM F. HUCK
RUDOLF WOLF
BY Albert C. Johnston
ATTORNEY

INVENTORS
WILLIAM F. HUCK
RUDOLF WOLF
BY [signature]
ATTORNEY

United States Patent Office 3,236,470

Patented Feb. 22, 1966

3,236,470

METHOD AND APPARATUS FOR SPLICING RUNNING PREPRINTED WEBS IN REGISTER TO PREPRINTED WEB ROLLS

William F. Huck, Forest Hills, N.Y., and Rudolf Wolf, Graefenhausen, Germany; said Wolf assignor to William F. Huck, doing business as Huck Company, New York, N.Y.

Filed Aug. 9, 1963, Ser. No. 301,106
Claims priority, application Germany, Dec. 20, 1962, H 47,764
39 Claims. (Cl. 242—58.3)

This application is a continuation-in-part of copending applications Serial Nos. 225,956 and 225,957, each filed September 18, 1962, those applications meanwhile having been abandoned.

This invention relates to a method and to apparatus for connecting or splicing a running web of preprinted material such as paper, cloth, metal or plastic foil, or the like, in register to a roll accelerated to the speed of the running web.

The invention is particularly useful for the registered splicing of a preprinted web running off an expiring roll thereof to the leading end of a new or replacement roll of the same preprinted web material, so that the preprinted web may be kept running at high speed from roll after roll into a machine processing it, without either loss of the required register condition or interruption of the operations upon the transition from one roll to another.

Such registered splicing operations are required for various practical purposes. Among them is the delivery of a preprinted web into a web processing machine for a further printing operation or for other processing operations performed in register with patterns previously printed on the web. Another is the insertion of a web preprinted by one process among webs being printed on the machine by another process, such as in newspaper or book printing work in which a web preprinted in color is to be inserted continuously among other webs with the respective patterns or leaf-forming lengths of the several webs always in register.

In known methods for splicing a running web in register to a new roll, the new roll in splicing position is brought to approximately the speed of the running web, and the splice is made when a photoelectric scanning system detects coincidence of a register mark on the periphery of the roll with a register mark on the running web. For assurance that register will be obtained, the new roll is wound with a whole number of register marks on its periphery, each spaced by the same pattern or register length from the others. Costly attention to the winding of the rolls and wastes of the preprinted material often are necessary in order to bring the rolls to this condition.

Moreover, the required coincidence between register marks respectively on the new roll and the running web is achieved in known practices only after a considerable period of rotation of the roll at nearly the web speed. The duration of this period is variable, being dependent upon the amount of displacement of the roll relative to the web that must occur before the marks come into coincidence. Since a splice must be made before the web supply of the expiring roll is exhausted, the splicing cycle is initiated while a considerable supply of the running web remains on the expiring roll. This supply must be large enough to suffice for the longest expectable period of achieving register. Accordingly, a very considerable amount of the preprinted material is wasted on the rolls removed from the rollstands.

It is an important object of the present invention to provide a method and apparatus by which splicing in register is achieved reliably irrespective of the number or the spacing of patterns or register marks on the periphery of the roll to be connected with the running web.

Another important object of the invention is to enable the reliable splicing of a new roll in register with a web running from an expiring roll, by operations started when but a very small or minimum supply of the web remains on the expiring roll, so that the wastes of preprinted material heretofore occurring at automatic splicing rollstands may be very substantially reduced.

Further objects of the invention include the provision of apparatus that will achieve those basic objectives and at the same time fulfill the requirements of reliability and serviceability which are important to the practical use of the invention in printing and other web processing plants.

According to the present invention, it has been found that these and other important objects can be achieved by the provision of a method and apparatus by which, in effect, one selects before starting the new roll on its splicing cycle a particular mark or location on its periphery which is to be in register with the running web when the roll is at the web speed, and also predetermines the amount of displacement of this mark which will have occurred when it is both moving at the web speed and in position for splicing; and as the roll is driven to reach that speed and position, the displacement of the mark is measured and the rate of displacement is correlated with the movement of register marks on the running web so that when the predetermined amount of displacement has occurred the mark on the roll will be in both speed and register coincidence with a register mark on the running web.

More particularly, use is made of a register measuring element which one fixes in a definite location relative to a mark or pattern on the periphery of the roll and which moves in proportion to the displacement of this mark or pattern upon rotation of the roll. This measuring element may, in principle, be fixed to any surface which upon rotation of the roll moves in proportion to the displacement of the mark or pattern on the periphery of the roll. In the processing of rolls of materials that tend to be wound with some eccentricity, the surface to which the measuring element is applied most advantageously is the periphery of the roll itself.

With the measuring element so fixed and the roll and the running web positioned for splicing, the roll is driven to the speed of the running web and said element is displaced correspondingly, so that upon a certain measurable displacement of the measuring element the mark or pattern on the roll is moving at the speed of the running web and is at splicing position. Meanwhile, the rate of driving and displacement is correlated to the movement of patterns or register marks on the running web so as to bring the pattern or mark on the roll into splicing position both at the speed of and in register with a pattern or mark on the running web. The required condition of speed and register coincidence thus occurs when the measuring element has undergone a certain measurable amount of displacement relative to its position at the start of the acceleration of the roll; and at this point, or at regular intervals afterward for as long as the speeds stay the same, the running web can be spliced in register to the periphery of the roll.

The register measuring element may in principle have any of various forms, including that of a wheel or a belt held in mutual driving relation to the roll with an index point at a definite initial location relative to a register mark on the roll. Most advantageously, however, this element has the form of a tape which is fixed by one end thereof to the periphery of the roll, then is wound onto the roll from its end applied thereto, and thereafter is drawn off the roll, for example, by the action of a winding drum engaging its other end, at the rate of the driving of the roll to the speed of the running web.

The tape or other measuring element can be caused to serve for merely registering the roll to the running web, or for both driving the roll to the web speed and registering it to the web. It is an important feature of some embodiments of the invention that a tape wound upon the roll serves both of these functions, delivering all the torque required for the acceleration of the roll and at the same time bringing the roll into register with the running web.

According to other important embodiments of the invention, an auxiliarly drive for the roll is also provided, for example, a conventional accelerating belt drive nonslipably engaging the periphery of the roll, and this drive is accelerated under a regulated torque so that a relatively small part of the accelerating load is borne by the measuring element, the major part of it being borne by the auxiliary drive.

The required correlation of the rate of driving the roll and displacing the measuring element to the movement of register marks on the running web also can be achieved in several ways. One way is to drive the measuring element from the beginning of the acceleration in a phased synchronism to the displacement of patterns or marks on the running web. Another is to modulate the rate of driving the roll and displacing the measuring element in response to signals from photoelectric scanners after the roll has reached the web speed.

It is most advantageous, however, to bring about this correlation in an early stage of the acceleration, as by modulating the rate of acceleration in relation to the movement of register marks on the running web, and to maintain it during further acceleration so that the required register coincidence is obtained and the splicing can be effected when the roll first reaches the speed of the running web. In this way the amount of the preprinted web material left on the expiring roll when the splice is made can be kept very small, and waste is reduced to a minimum.

This advantage can be achieved quite effectively by the use of a driving and registering tape with a series of index marks spaced apart at progressively increasing distances, which marks are moved with the tape and are correlated in position to the movement of register marks on the running web by the action of a scanning system that modulates the rate of acceleration of the tape and the new roll.

The apparatus provided according to the invention may be constructed in a variety of forms, some largely mechanical, some largely electrical, and some making use of mechanical, electrical and hydraulic components. An especially advantageous apparatus makes use of a hydraulic motor driving a winding drum for a tape that drives and registers the new roll, this motor serving not only to bring the roll into register with the running web as speed coincidence is reached but also, in preparation for a splicing cycle, to pay out tape from the drum for attachment to a new roll and to establish tape tension conditions contributing to the reliability of other operations which ordinarily will precede the acceleration of the roll.

The foregoing and other objects, features and advantages of the invention will be further apparent from the following detailed description and the accompanying drawings of illustrative embodiments of the invention. In the drawings.

Figures 1, 2:
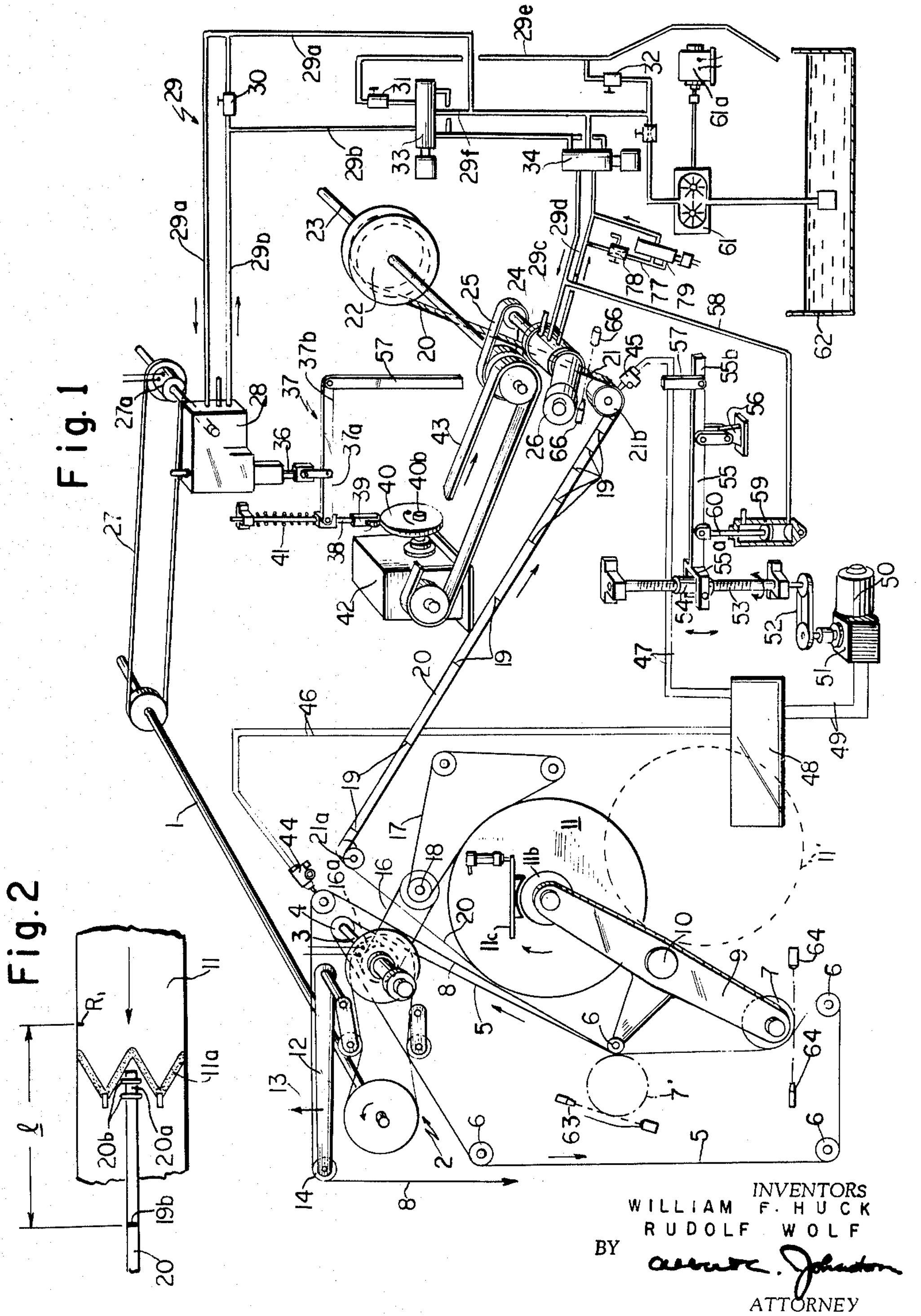
FIG. 1 is a schematic view of an apparatus of a preferred construction according to the invention, making use of mechanical, electrical and hydraulic components.
FIG. 2 is a diagram of a manner of attachment of a roll accelerating register tape to the periphery of a preprinted web roll.

Referring to FIG. 1 of the drawings, a main driving shaft 1 is connected with the drive of a web printing or other web processing machine (not shown). The shaft 1 drives, via a tension regulating transmission 2, a shaft 3 to which a pulley 4 is fixed for driving web propelling belts 5. Several belts 5 are provided adjacently and are driven continuously in a path determined by the positions of guide pulleys 6.

The belts 5 drive an expiring roll 7 of the preprinted web material, such as paper, by frictionally engaging the periphery of the roll. From the roll 7, a running off web passes continuously into the processing machine. The roll 7 is rotatably journalled in one end of a double armed lever 9 which is pivotable about a stationary bearing 10 and carries a replacement roll 11 of the preprinted web material at its other end. In the drawing the arm 9 is shown in a splicing position with the new roll 11 and the web 8 running from the expiring roll 7 positioned near to each other in readiness for the commencement of a splicing cycle.

The tension regulating transmission 2 is a variable ratio V-belt drive of known character. A lever 12 on which a constant force acts in the direction of the arrow 13 carries at one end a roller 14 over which the running web is guided. A deflection of the lever 12 by the tension of the running web 8 presses a roller 15 connected to the lever against the belt of the transmission 2 and varies the transmission ratio between the shafts 1 and 3, thus altering the speed of the driving belts 5. If, for example, the tension of the running web 8 increases, the roll 7 is turned faster to feed more web, and vice versa.

A belt drive 17 is driven by the shaft 3, via a coupling belt 16, as an auxiliary drive for the replacement roll 11. The belt drive 17 is arranged in known manner to pivot about a spindle 18, so that it may be brought into engagement with the roll 11 when desired. When in driving position, it bears non-slipably against the periphery of the roll. If it is to take part in the acceleration of the roll, a variable torque coupling, for example, a variable induction or electromagnetic clutch **16*a* transmitting power to the driving pulley of coupling belt 16, is provided in the driving connections to the belt 17**.

The replacement roll 11 may be prepared in a known manner for splicing to the running web 8, that is to say, its leading end has an adhesive coated thereon, as indicated diagrammatically at **11*a*** in FIG. 2, so that it will join with the running web and run off the roll into the machine when the running web is pressed against it to make the splice.

A measuring tape 20 having a series of index marks 19 thereon is provided for accelerating the roll 11 and registering it to the running web. As indicated in FIG. 2, one end 20*a* of this tape is fixed to the periphery of the roll, for example by attachment strips or tapes 20*b* which allow it easily to be pulled off the roll, at a location substantially coincident with the glued leading end 11*a* of the rolled web, and with the last index mark 19*b* on the tape spaced from the leading register mark $R_1$ on the roll by a distance $l$ equal to the register length, i.e., the pattern intervals, of the preprinted web material. Its end having thus been fixed in a definite location relative to a mark or pattern on the roll 1, the tape is now wound about the periphery of the roll. As seen in FIG. 1, the spaces between the index marks 19 increase progressively from right to left, to a spacing near the attached end of the tape that is equal to the register length of the running web and the preprinted web of the replacement roll.

The tape 20 passes from roll 11 about guide pulleys 21*a* and 21*b* and from the latter to a winding drum 22 to which its other or right-hand end is fixed so that it will be drawn off the roll by rotation of the drum. The drum 22 is fixed to a shaft 23 which is driven from a shaft 24 by way of a belt 25, and shaft 24 is driven by a hydraulic motor 26.

A hydraulic pump 28 driven by the main driving shaft 1 via a belt drive 27 acting through an electromagnetic clutch 27*a* propels liquid under pressure, such as oil, to the motor 26 by way of a hydraulic pipe line system 29. This system includes liquid supply and output lines 29*a* and 29*b*, respectively, at the pump, and pressure and discharge lines 29*c* and 29*d*, respectively, at ports of the motor 26 which function as intake and discharge ports when the motor is driving the drum 22 in tape winding direction. Pressure reduction valves 30, 31 and 32 and solenoid-operated hydraulic switch valves 33 and 34 are located in the pipe line system. In operation to draw the tape off the roll, oil under pressure flows out of the pump 28 through line 29*b*, switches 33 and 34 and line 29*c* to the motor 26 and back to the pump through discharge line 29*d* and ports of switch 34 connecting this line with supply line 29*a*.

The power output of the pump 28 is regulated by a control slide 36. The free end of this slide is pivotably connected to a double-armed lever 37. One arm 37*a* of the lever 37 is pivotably connected to a vertically slidable push rod 38, the lower end of which carries a follower 39 for a cam disc 40. The follower is pressed against the cam disc by a compression spring 41.

A reduction gear 42 for driving the cam disc 40 is driven by the motor 26 via a belt drive 25, the shaft 23 and a gear belt drive 43. The speed reduction is selected so that the cam disc 40 makes somewhat less than one rotation during the entire run-off of the tape 20 from the roll 11.

The cam disc is formed with a contour progressively changing in elevation in accordance with a desired curve or program of acceleration of the roll 11 to the speed of the running web. Its elevation is varied in increments correlating exactly to the varied distances between the index marks 19 displaced with the tape. As it is turned it progressively elevates the push rod 38, starting from a low position of the follower at the beginning of its movement, and consequently the control slide 36 is moved upwardly at a regulated rate by which it progressively increases the quantity of liquid and the power delivered by the pump 28 to the motor 26. In this way the speed of the motor 26 is increased at a regulated rate and so that the peripheral speed of the roll 11 is equal to the speed of the running web 8 when the tape 20 becomes unwound from the roll 11.

Two photoelectric scanners 44 and 45 are provided, one 44 of which scans the register marks on the running web 8 while the other scanner 45 scans the index marks 19 moving with the tape 20. The two scanners issue signals giving continual comparisons of the positions o the tape and the splice area 11*a* and mark $R_1$ on the ro 11, and of the register marks on web 8, relative to th point tangential to roll 11 where the splicing is to occu These signals are carried by leads 46 and 47 respectivel to a register control apparatus 48 of known nature, whic apparatus detects any time differential of the passage o the register marks and the index marks and correspond ingly produces a control or monitor signal.

The control signal is fed through a lead 49 to a re versible register correction motor 50, whose directio of rotation is determined by the electrical sign of th signal. The register correction motor drives, via a reduc tion gear 51 and a belt drive 52, a screw 53 which di places one end 55*a* of a lever 55 by means of a nut 5 The lever 55 is pivotably connected to a support bearin 56. Its other end 55*b* is pivotably connected by mear of a rod 57 to the end 37*b* of the lever beam 37.

Accordingly, when the screw 53 is turned in respons to the control signal fed to the motor 50, the contro slide 36 is displaced proportionately by the lever 55, th rod 57 and the lever 37. In this way a change is mad in the rate of delivery of liquid to pump 28 programme by the action of the cam disc 40, and the rotary spee of the motor 26, hence the rate of the acceleration of th tape 20 and roll 11, is modulated correspondingly. Th modulation is continued and it reduces the time differ ential between the instants when the index marks 19 ru past the scanner 45, on the one hand, and the instant when the register marks pass the scanner 44, on the othe hand, until these marks are passing the respective scan ners in coincidence. The leading register mark $R_1$ o the roll 11 then is assured of coming into register wit a register mark on the running web 8 at the moment whe it reaches splicing position with the speed of the wet The rate modulating action can be intensified, so as t establish the required coincidence of index marks an register marks at an earlier stage of the acceleration, a follows: The pressure pipe line 29*c* leading to the moto 26 has a branch 58 which leads to a liquid displacemen or booster cylinder 59. The piston rod 60 of this cylin der is pivotably connected to the lever 55 and thus par ticipates in any displacement movement of the nut 5 When the piston rod 60 moves downwardly, for exampl additional hydraulic fluid is fed through the branch 5 into the motor 26 and imparts thereto additional accel eration. When, conversely, the piston rod 60 moves up wardly, the acceleration of the motor 26 is momentaril delayed because some of the hydraulic fluid delivere by the pump 28 is displaced away from the motor int the branch 58.

The pipe line system 29 is connected to an oil suppl tank 62 by a vane-type feed pump 61 driven by a moto 61*a*.

In normal operation of the rollstand shown in FIG. 1 the unwinding web roll is in the position 7' shown i broken lines, and the replacement paper roll is introduce into the arm 9 in the position 11' shown in broken lines A roll control device 63 comprising a light source an a photoelectric cell responds as soon as the roll at 7 has been reduced to a comparatively small diameter Then the arm 9 is swivelled by control means (no shown) so that the expiring roll comes into its lowe position shown at 7 while the replacement roll with th tape 20 wound upon it and extending taut to the windin drum 22 is brought into its upper or splicing position a 11, where it is closely adjacent to the running web During this movement of the replacement roll and whil it is located and being accelerated in splicing position its core 11*b* desirably is engaged by a friction brake 11 acting with a force sufficient to keep it from being rotate except as and to the extent determined by the movemen of the tape.

Another photoelectric roll control device 64 gives th signal when the roll 7 is coming to its end. Thereupon by means of the hydraulic switches 33 and 34, the motor 26 is started so that the tape 20 is drawn off the roll 11 to the winding drum, and correspondingly the roll 11 is accelerated. The achievement of the required register when the roll reaches the speed of the web 8 is ensured during the acceleration by modulation of the rate of drawing off the tape, as already described. This modulation is preferably effected in the initial stage of the acceleration process so that all further acceleration is effected with coinciding registers, that is to say, with coincidence of the index marks 19 and the register marks on the running web 8.

As soon as the roll 11 has reached the speed of the web, which occurs before the end 20*a* of the tape is pulled off the roll, the auxiliary drive 17 while being driven at that same speed is swung downward against the periphery of the roll. In this manner of operation, wherein the auxiliary drive 17 does not take part in the acceleration of the roll, the clutch 16*a* in the driving train to the belts of drive 17 is fully engaged before the belts are lowered into contact with the roll. The auxiliary drive then takes over the driving of the roll and continues it with uniform speed and register.

Meanwhile, the splicing of the running web to the end of the roll rotating at the web speed is effected by pressing the web against the adhesive-coated area 11*a* of the roll. This step is performed at a moment when the tape has brought the roll end 20*a* to splicing position next to the web 8, which moment is definitely determinable by the fact that the tape then will have undergone a certain measurable displacement from the position it occupied at the start of the acceleration of the roll.

For example, the splice may be made by the actuation of conventional splicing brushes (not shown in FIG. 1) at the moment when an index element 21 on the tape reaches the beam of a photoelectric control device 66 that scans the tape 20 as the end of the tape is about to be ripped off the roll. Simultaneously with the splicing action of the brushes, the web still running from roll 7 is cut off by knives (not shown) below the point of connection with the roll 11. Then the roll 11 while being unwound by belt drive 17 is swung to the left (FIG. 1) so that it comes into contact with the driving belts 5 and finally assumes approximately the position of the previous roll at 7'. This movement separates the roll 11 from the auxiliary drive 17, which is no longer required until another new roll at splicing position is to be connected with the web running from roll 11 as the web supply of the latter nears its end.

The splice having been made and end 20*a* of the tape pulled off the roll 11, the motor 26, drum 22 and cam drive 40 are continued in operation to wind the full length of the tape onto the drum and to bring the cam disc through the remainder of a full revolution thereof, to the starting point of its cycle. In this stage of the operations, a falling part 40*a* of the contour of the cam disc (see FIG. 6) lowers the follower 39 and slide 36 to the position they will occupy at the start of a new splicing cycle, in which position the pump 28 will deliver liquid to the motor at the rate required for the beginning of the acceleration of the next roll to be spliced to the running web.

Figures 3, 4, 5, 6, 7:
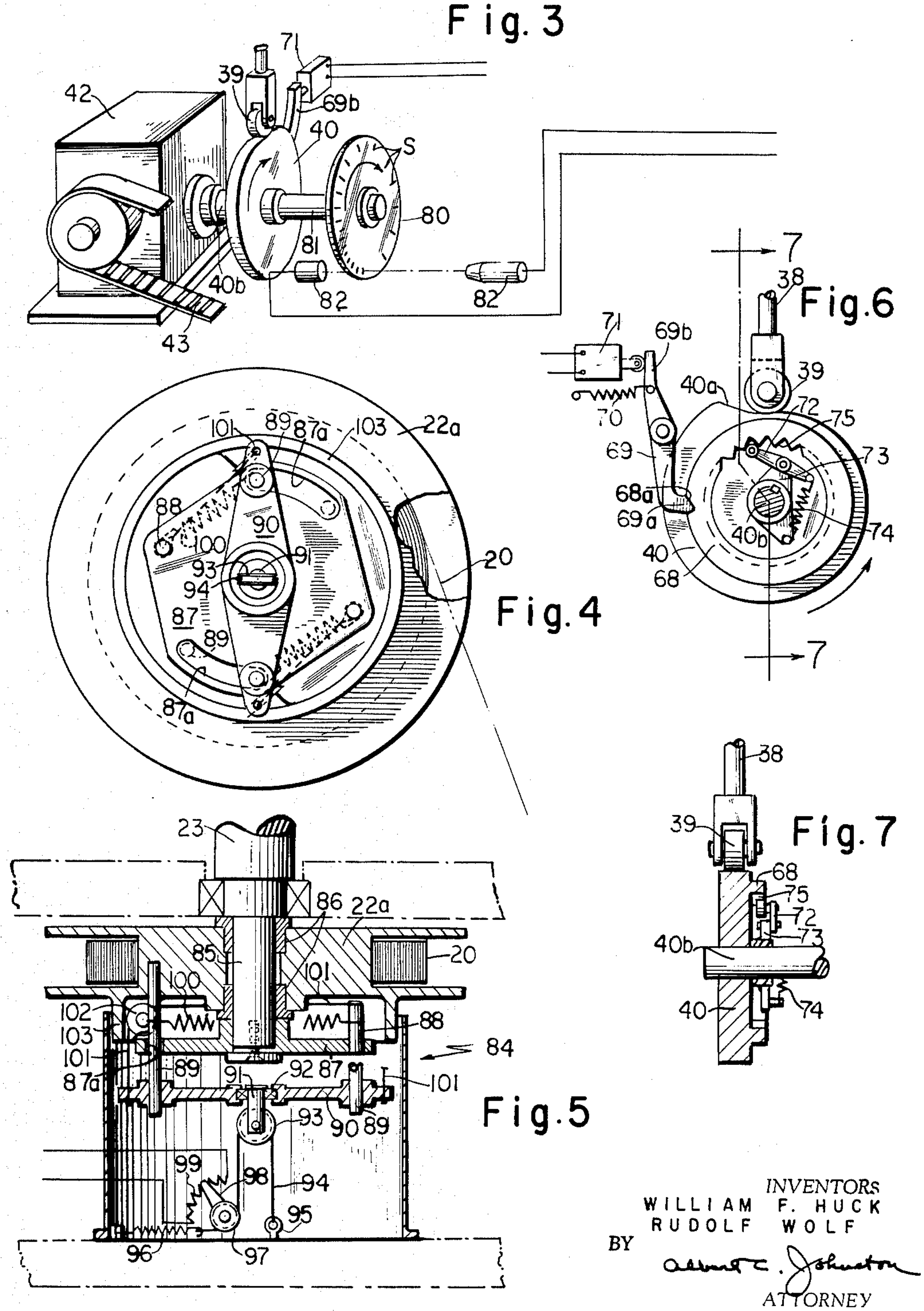
FIG. 3 is a schematic perspective view showing a modification of the drive regulating cam mechanism of FIG. 1 and an alternative arrangement of scanned index marks displaced with the tape.
FIG. 4 is a rear elevational view of a modified tape winding mechanism whereby the roll accelerating torque of the tape may be limited and that of an auxiliary roll drive regulated correspondingly.
FIG. 5 is a sectional view along the axis of the same mechanism.
FIG. 6 is a rear elevational view of the cam mechanism of FIG. 3.
FIG. 7 is a sectional view thereof along line 7—7 of FIG. 6.

The cam disc can be assured of being indexed accurately to the required starting point by a mechanism as shown in FIGS. 3, 6 and 7. A ring 68 fixed to the disc is formed with a peripheral notch 68*a* adapted to be engaged by an angled end 69*a* of a lever 69 constantly pressed against the ring by a spring 70. The lever end seating in the notch fixes the desired starting point of the cam disc.

The seating of the lever end first occurs when the falling part 40*a* of the cam disc is beyond the follower and the tape 20 fully wound on drum 22. A tail 69*b* of lever 69 then trips a limit switch 71 to inactivate the pumps 28 and 61 by deenergizing the clutch 27*a* and motor 61*a*. The hydraulic system thus may be rendered inactive until another roll of the preprinted web is to be prepared for splicing.

The notch 68*a* and angled lever end 69*a* are so formed that the cam disc can overrun its starting point under momentum existing in the drive system when the pumps are deenergized. Nevertheless, the required starting position will be regained when the tape 20 is drawn off the drum 22 to be attached to the next new web roll in preparation for splicing, for the cam disc is then rotated backward by its connection with the drum until the lever end has bottomed in the notch so as to prevent further backward rotation of the cam disc.

Unwinding movement of the drum 22 to issue the length of tape required for winding onto the new roll can be effected thereafter without displacing the cam disc from the set starting position, by virtue of a connection between cam gear 40 and its driving shaft 40*b* whereby slipping can occur between these points upon backward or tape unwinding rotation of the drum 22, shaft 23 and shaft 40*b*. This connection, as shown in FIGS. 6 and 7, may be provided by a roller pawl 72 which is carried on an arm 73 fixed to shaft 40*b* and is pressed by a spring 74 into engagement with ratchet teeth 75 formed on the inner periphery of ring 68. The pawl 72 can be rolled over the ratchet teeth by clockwise movement of the shaft 40*b* as seen in FIG. 6, which occurs with unwinding movement of the drum 22, but it forces the cam disc to rotate with it whenever the drum and shaft 40*b* are rotated in the direction to draw the tape off the roll and accelerate the roll.

The hydraulically driven embodiment of the invention as shown in FIG. 1 provides further features of operation which are advantageous in the readying of each new roll for the splicing cycle.

The drum 22 can be driven in unwinding direction, so as to pay out the length of tape 20 needed for attachment of the tape end 20*a* to the new roll 11, by energizing switch valve 33 and the motor 61*a* of vane pump 61. A manual pushbutton (not shown) will close circuits to these components, whereupon liquid from the supply pump 61 is forced into the discharge line 29*d* of the hydraulic motor 26 so as to pass through this motor in reverse direction and out of it through line 29*c*, switch valves 34 and 33, reduction valve 31 and a backflow line 29*a* leading into supply tank 62. The setting of reduction valve 32 limits the pressure to be applied by pump 61 to line 29*d*, and the reduction valve 31 in the return circuit is set for a somewhat lower pressure so as to give an effective limited pressure differential, for example, of 10 p.s.i., suitable for the movement of the motor 26 and drum 22 in unwinding direction.

This reverse or tape-unwinding flow of liquid through the motor 26 is discontinued, as by releasing the pushbutton to deenergize switch valve 33, when the needed length of tape has been payed out to the new roll. The motor 61*a* then may be continued in operation by a relay holding its circuit closed.

The new roll ordinarily will now be located at the loading position 11' of the rollstand. An attendant threads the tape unwound from drum 22 around the guide rollers 21*b* and 21*a* to the periphery of the roll and attaches the end 20*a* of the tape in register thereto as previously described.

At this point of the operations, according to a further feature of the invention, the hydraulic system is caused to supply liquid under a limited pressure to motor 26 through pressure line 29*c* at the (normally) intake port of the motor, so that the hydraulic motor will act through the drum 22, in tape winding direction, to hold the tape taut to the roll and yet to enable the tape to be drawn from the drum, for winding onto the roll, by manual rotation of the roll.

For this purpose, a by-pass line 77 is provided which connects pressure line 29*c* with discharge line 29*d* through a flow constricting device 78 and a normally closed solenoid-operated switch valve 79, and a pushbutton circuit (not shown) is provided for energizing switch valves 33, 34 and 79 so that hydraulic pressure from the vane pump 61 will enter pressure line 29*c* and act with a limited force to urge the motor 26 and drum 22 in tape winding direction. The force of the liquid is limited to the extent desired by the setting of the flow constricting device 78 in by-pass line 77. The return flow from this line, with any from the motor 26, passes through valves 34 and 33 and backflow line 29*e* to the tank 62.

The attendant now turns the roll at position 11' by hand to wind the attached tape 20 taut upon the periphery of the roll. When the amount of tape so wound has reached the predetermined length required for the registering acceleration of the roll, the movement of the tape onto the roll is stopped and the relative position of the tape and the roll is stabilized, as by energizing the core brake 11*c*. This stopping action can be effected automatically at the correct moment by the signal of a photoelectric scanner, similar to the one shown at 66, positioned to be energized by an index element on the tape 20 when the tape is moved to just the right length of extension from the drum 22 to the web roll.

According to still another feature of this hydraulic embodiment of the invention, the signal that actuates the core brake 11*c* to stop the winding of the tape onto the roll is also utilized to energize the clutch 27*a*, thus starting the main hydraulic pump 28 under power from the main drive shaft 1, and at the same time to energize switch valves 33 and 34 while deenergizing switch valve 79. The initial relatively low power output of the pump 28, as fixed by the low contour of the cam disc 40, is thus channeled through valve 33 into a branch 29*f* of the supply line 29*a*, which branch is then in communication with motor 26 through valve 34 and pressure line 29*c* and with backflow line 29*e* through the pressure reduction valve 32. The hydraulic pressure thus established on the motor 26 is limited by the setting of reduction valve 32 to a value, for example, one of 75 p.s.i., insufficient to overcome the torque of the core brake 11*c* but sufficient to hold the tape 20 quite tight on the roll and between it and the drum 22, hence in readiness for the splicing cycle.

While these preparations of the new roll for the splicing cycle can be carried out while the roll is in splicing position, they ordinarily are carried out while it is positioned away from the running web, as at 11'. When the roll-stand arm 9 is rotated to place the roll in splicing position, as it appears in FIG. 1, the brake 11*c* holds the roll 11 and the tape 20 in their pre-fixed relation and any attendant displacement of the tensioned tape is attended by an exactly corresponding angular displacement of the winding drum.

It will be evident that a series of index marks performing the function of the marks 19 of FIG. 1 can be provided in ways other than by forming them on the tape 20. It is necessary only that these marks be moved with and in proportion to the roll-accelerating displacement of the tape and the cam disc 40. An alternative arrangement of them is shown in FIG. 3 where, in lieu of the marks 19 on tape 20, a circular series of slots S is provided in a disc 80 which is secured to an extension 81 of the cam driving shaft 40*a* of speed reduction unit 42. The marks S of this circular series, like the marks 19 on web 20, have progressively increasing spacings which, when the new roll is being accelerated so as to come into register with the running web upon reaching its speed, correspond in the time of their travel past a scanning beam to the time of travel of a register length on the running web 8 past the beam of its scanner 44. A beam scanning the index marks S of slot form is provided by a photoelectric scanner 82 having the same function in the control system as the scanner 45 of FIG. 1.

In uses of the invention where the running web is to be spliced to relatively heavy, massive rolls, it may be desirable to deliver a large amount of the torque for accelerating the new roll through the belt drive 17 or an equivalent drive and to deliver only a relatively small amount of accelerating torque through the measuring tape. In this way, the service life of the tape may be increased or its size reduced and the precision of its registering functions enhanced. Where the acceleration is to be effected in this way, the belt drive 17 is moved into engagement with the new roll 11 before the beginning of the splicing cycle, and as the tape is drawn off the roll the belts of drive 17 are driven with a suitably regulated torque established by progressively energizing the electromagnetic clutch 16*a*, or other suitable variable torque coupling, from its lowest to its full coupling capacity over the full period of the acceleration.

According to a further development of the invention as illustrated in FIGS. 4 and 5, the tape winding drum is provided with a control mechanism acting throughout the acceleration period to keep the torque applied to the roll through the auxiliary drive in a predetermined relationship to the torque applied through the tape 20. For example, such a mechanism may be designed so that about 90% of the total accelerating load will be borne by the belt drive 17 and about 10% of it by the tape.

The mechanism shown for achieving this result is essentially a torque measuring clutch 84 which is secured to and rotates with a tape winding drum of the modified form seen at 22*a* in FIG. 5. This clutch measures the magnitude of the torque applied to the new roll through tape 20 and transmits an electrical current which energizes the variable torque coupling at 16*a* and then is progressively increased so as to increase correspondingly the power output of that coupling.

As shown in the drawings, the drum 22*a* itself is mounted for rotation on extension 85 of its driving shaft 23 by means of sleeve bearings 86. The shaft extension 85 has fixed thereto a disc 87 carrying two pins 88 which project toward the drum. Projecting outwardly from the drum through arcuate slots 87*a* in disc 87 are two relatively long pins 89 which have a bar 90 slidably supported on their ends. The bar carries a pin 91 at its center, in a bearing 92 which allows this pin to remain stationary while the bar is rotated by the long pins 88 in unison with drum 22*a*.

The central pin 91 rotatably supports a pulley 93 about which a cable 94 is passed with one of its ends anchored as at 95 and its other end attached to a spring 96 continuously tensioning the cable. Between its ends the cable 94 is wound in several turns about a control pulley 97 which turns on a fixed axis and carries a wiper arm 98 governing the output of a rheostat 99 connected in the electrical supply circuit to coupling 16*a*.

Accordingly, any sliding displacement of bar 90 on pins 89 is attended by a rotation of pulley 97 and wiper arm 98 and by a corresponding variation of the electrical current passing through the rheostat to the coupling 16*a*.

Each long pin 89 is connected to one of the pins 88 on the disc 87 by a tension spring 100 that continually urges the long pin and bar 90 clockwise relative to the disc, as viewed in FIG. 4, up to one limit of the angular movability of the pins 89 in the arcuate slots 87*a*. Each end of the bar 90 has secured to it one end of a cable 101 that extends in axial direction to an idler pulley 102 mounted on flange 103 of the drum 22*a*, and thence over the disc 87 to one of the pins 88 thereon. The pull of the spring 96 on the rheostat cable 94 and bar 90 keeps the cables 101 under tension.

The control mechanism 84 thus constituted operates as follows:

When a tensile force to rotate the roll 11 is applied to the tape 20 through rotation of shaft 23 and drum 22*a* the inertia of the roll causes an angular displacement of the drum and bar 90 relative to the rotating disc 87 against the force applied by the tension springs 100. This displacement moves the outer end of each cable 101 closer to its inner end connected with a pin 88, thereby producing play in the cables 101 that allows the tensioned cable 94 to slide the bar 90 outwardly on the long pins 89 and at the same time to rotate the rheostat arm 98 through an arc proportional to the relative angular displacement of the drum. The attendant change of the rheostat setting increases correspondingly the coupling current passing through the electromagnetic clutch 16*a*, thus causing the belt drive 17 to act upon the roll 11 with an accelerating torque that will perform most of the work of accelerating the new roll and limit the torque applied through the tape to an amount determined by the tension of the springs 100.

Figures 8, 9:
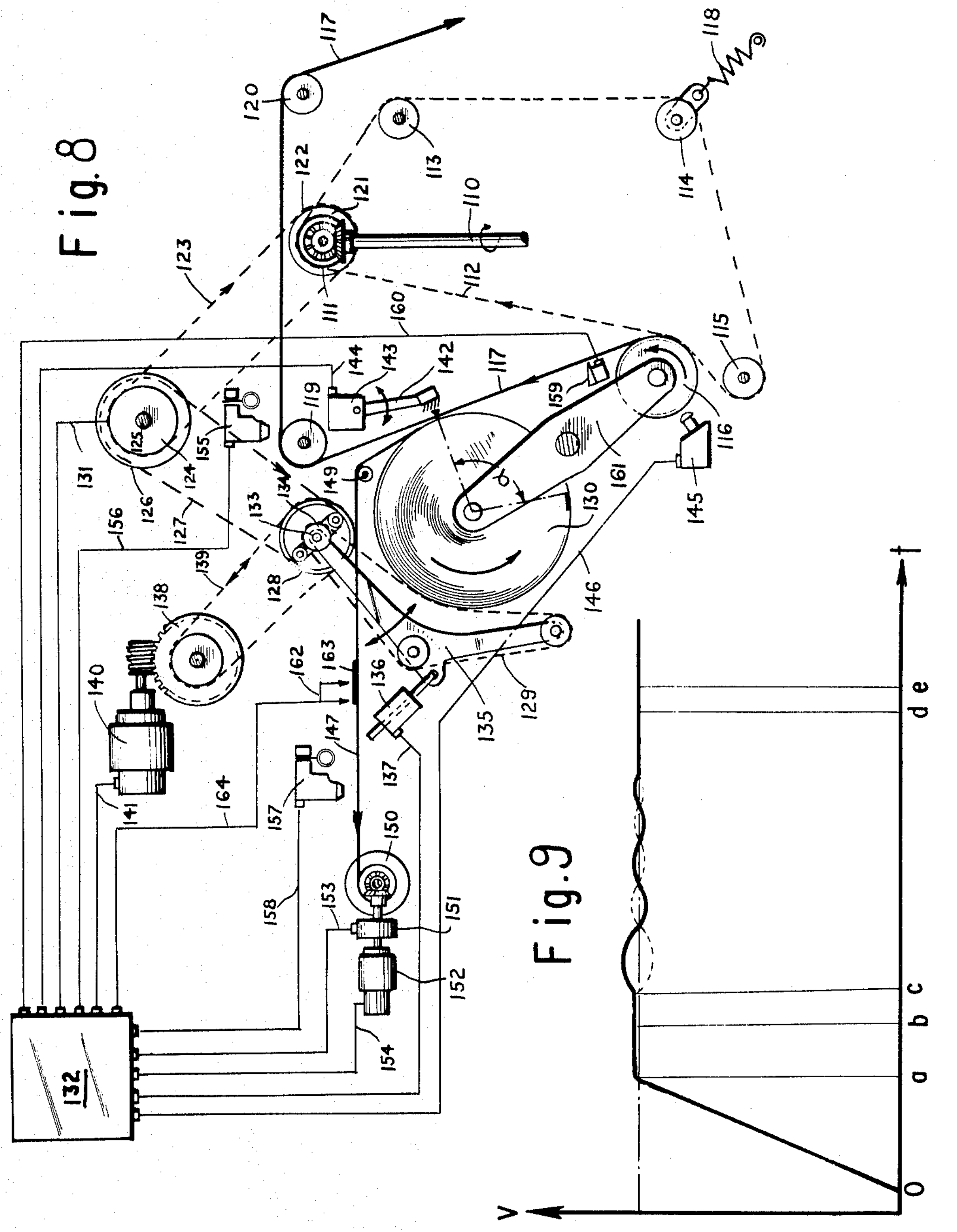
FIG. 8 is a schematic view of another embodiment of the invention, in which the tape driving and registering elements are principally electrical.
FIG. 9 is a diagram of a cycle by which register synchronization may be reached with the apparatus of FIG. 8.

An embodiment of the invention making use of electrically motivated register control means is shown in FIG. 8 of the drawings.

Figure 10:
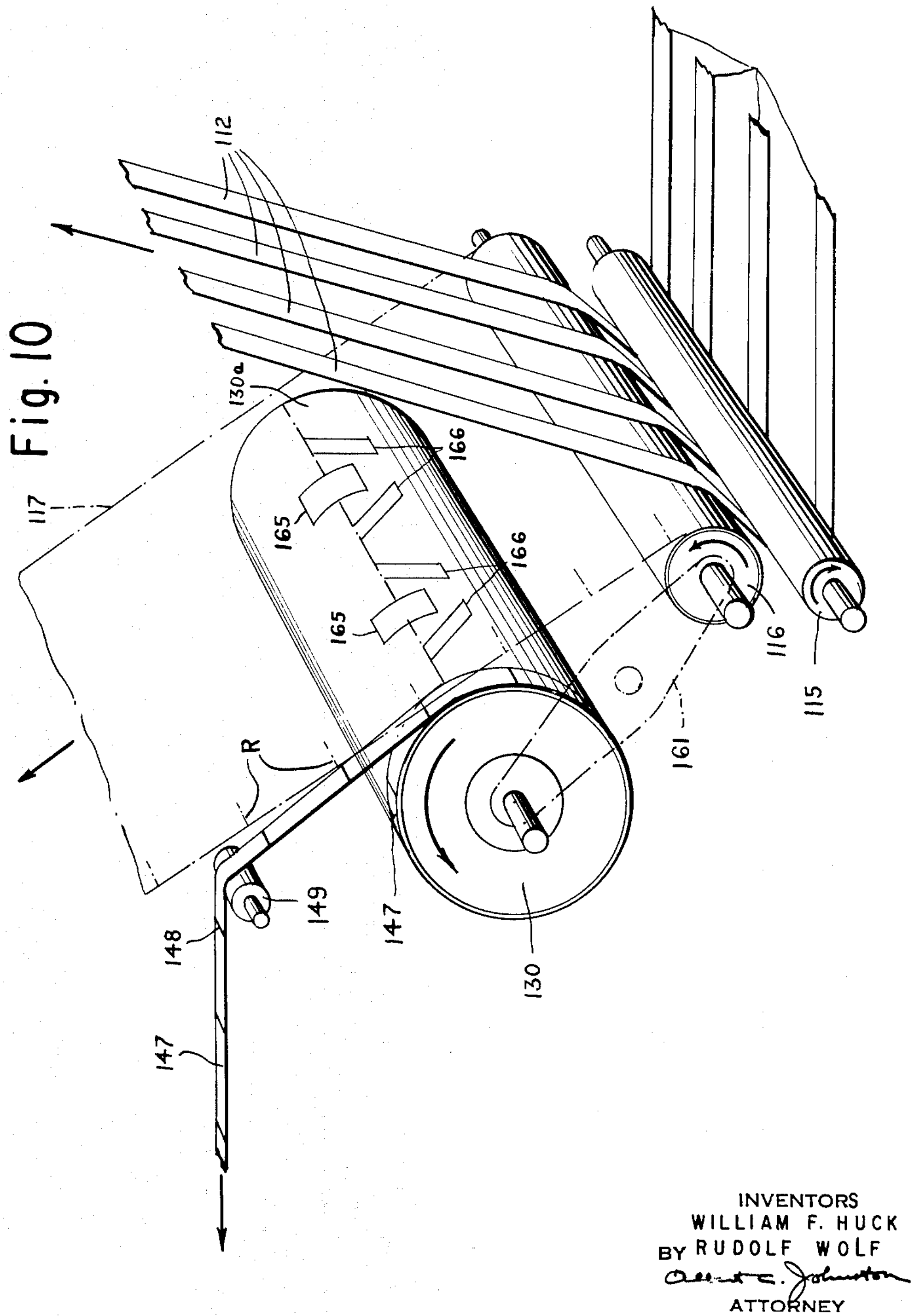
FIG. 10 is a schematic perspective of a new roll and a web from an expiring roll running in register at the web speed, with a registering tape still unwinding from the new roll.

The unwinding rollstand according to FIG. 8 is driven from a main driving shaft 110 synchronized with the web processing machine, which shaft drives a pulley 111 driving the web propelling belts 112. As shown in FIG. 10, several parallel driving belts 112 are provided. These belts pass around guide pulleys 113, 114 and 115 and drive an expiring roll 116 from which a preprinter web 117 carrying register marks at regular pattern intervals runs continuously into the processing machine. A compensating device 118 (FIG. 2) ensures that the belts 112 adapt themselves to the periphery of the unwinding roll 116 as its diameter decreases.

The running web 117 passes over guide rollers 119 and 120 into the processing machine. A belt pulley 122 is provided on the shaft 121 on which the main driving pulley 111 is located and is connected by a driving belt 123 to a variable torque coupling device 124, e.g., an induction or electromagnetic clutch, located on a shaft 125. Also located on the shaft 125 is a belt pulley 126 which can be coupled by way of device 124 to the shaft 125. The belt pulley 126 is connected through a driving belt 127 to a differential mechanism 128 which in turn drives a system of belts 129 engaging the periphery of a replacement roll 130 that is to be connected in register with the running web 117. The induction clutch 124 is connected to a control panel 132 through a lead 131.

The mechanism 128 includes a driven belt pulley located on a shaft 133 and a differential gear connecting this pulley with a pulley 134 driving the accelerating belts 129 for the replacement roll 130.

The roll accelerating belts 129 are trained about guide pulleys on a frame 135 which is swingable on shaft 133 by the action of a suitable motor device 136 to move the belt drive 129 to and from its working position in driving relation to the periphery of the roll 130 and to permit swinging movement of this drive with the roll 130 as the latter with the running web spliced thereto is displaced towards the web propelling belts 112 to be driven by them. The motor device 136 is shown schematically and is connected through a lead 137 to the control panel 132.

The outer rim of the differential mechanism 128 is connected to reduction gearing 138 by way of belt 139, and the gearing 138 is driven by a register motor 140 which is connected to the control panel 132 through a lead 141.

Brushes 142 are provided opposite the splicing position occupied by the replacement roll 130 and the running web 117 when they are to be connected together. A drive 143 for the brushes is connected by a lead 144 to the control panel 132. A cutter 159 for severing the running web 117 after the splicing is controlled by the panel 132 through a lead 160.

A photoelectric roll control device 145 is associated with the expiring roll 116 and connected by a lead 146 to the control panel 142.

A register tape 147 that may be similar to the tape 20 hereinabove described is wound around the periphery of the replacement roll 130. This tape 147 has index marks 148 (FIG. 10) spaced apart thereon near its end attached to the roll by a distance equal to the register length, or distance between register marks R, of the running web 117 and also of the web of the replacement roll 130.

The register tape 147 is attached to the periphery of the roll 130, as by pasting its end thereto, in such manner that an index mark of the tape coincides with or is spaced by a register length from a register mark of the roll. The tape is disposed over guides 149 and secured to a winding drum 150. This drum is coupled through a variable torque coupling 151, for example, an electromagnetic or induction clutch, with an electric driving motor 152. The coupling 151 and the motor 152 are connected by leads 153 and 154 to the control panel 132.

A photoelectric scanner 155 which scans the register marks or pattern length of the running web 117 is arranged above this web and is connected by a lead 156 to the control panel 132.

Another photoelectric scanner 157 is arranged above the register tape 147 in position to scan the index marks 148 thereon and is connected by a lead 158 to the control panel 132. The two scanners 155 and 157 act through the control panel to control the register motor 140.

Both the expiring web roll 116 and the new roll 130 to be connected to the running web 117 are located, in the embodiment illustrated, on a roll support 161 which can be swung in the clockwise direction as seen in FIG. 8 while work is proceeding. The control and operating means of this roll support 161 are not shown. Instead of a rotatable roll support, lifting or displaceable roll supports for the two rolls can be provided.

Arranged above the register tape 147 is an indicator or switch 162 which responds to a special index element 163 in or on the register tape. This indicator is connected through a lead 162 to the control panel 132.

The torque transmission of the coupling 124 from the main drive shaft 110 is controllable so that a gradually increasing speed can be imparted to the roll driving belts 129 until the peripheral speed of the replacement roll 130 corresponds to the speed of the running web 117.

The preprinted roll 130 is prepared for splicing by providing its leading web end 130*a* (FIG. 10) with tacking portions 165 and with glued portions 166 to join it with the running web. The roll is then introduced into the roll support 161, and the register tape 147, which when not in use is wound onto the drum 150, is drawn off the drum sufficiently to be threaded into the guide path and fixed by one end to the periphery of the roll 130. The tape may be attached by cementing its end to the roll at a location where an index mark 148 on the tape coincides with a register mark R on the periphery of the roll.

The roll 130 is then turned to wind the measuring tape onto its periphery while the tape unwinds from drum 150. This operation is concluded when a certain index element of the tape has reached a measurement position, e.g., that of scanner 157, at which the required length of tape is wound onto the roll.

When the replacement roll 130 is to be swung into the splicing position, where it appears in FIG. 8, the drum motor 152 is switched on and at the same time the drum coupling 151 is supplied with a low coupling current, the roll being held against rotation. This slightly tightens the tape and winds onto the drum an amount of tape that becomes free again as the roll is raised into the splicing position.

Upon arrival of the roll 130 at the splicing position, the motor device 136 of the belt drive frame 135 is actuated to place the drive belts 129 in driving position where they engage firmly about a part of the periphery of the roll 130. At the same time the motor 143 for the brushes 142 is actuated so that the brushes assume their position opposite the splice point in readiness for pressing the running web against the periphery of the new roll.

When the expiring roll 116 has unwound to a minimum diameter, the roll scanning device 145 gives an appropriate signal to the control panel 132. Then the induction couplings 124 and 151 are switched on by the control panel, and the roll 130 is accelerated to the speed of the running web at a rate limited by regulation of the current supply to coupling 124, while the register tape 147 is continuously held taut and drawn off the roll onto the winding drum 150 by the action of motor 152 and coupling 151. The tape thus is displaced by a distance corresponding exactly to the amount of rotational displacement of the glued leading web end and leading register mark on the periphery of the new roll.

When the roll 130 reaches the speed of the web 117, the index marks 148 on the tape and the register marks R on the running web activate the scanners 155 and 157 so as to generate register signals to the control panel 132. The control panel compares these signals and issues register correction signals activating the register motor 140 and thus the differential mechanism 128. This motor and mechanism respond to the correction signals, in a manner known per se, to vary the rate of the driving of the roll and correspondingly of the drawing off of the tape so that the index marks on the tape are brought into register or position coincidence, as well as speed coincidence, with register marks on the running web, before the tape is drawn entirely off the roll.

The special index element 163 on the tape then arrives at the indicator or scanner 162 and generates a signal acting through the control panel to energize the splicing brushes 142 and web cutter 159 and thus effect the splicing. The splice is made at a certain moment after the index element generates the splicing signal, when the roll 130 has rotated through a certain angle $\alpha$ to the splice point.

The register tape 147 then runs off and becomes detached at its affixed end from the roll 130, and is wound up to its end onto the drum 150. The synchronized speed and register conditions achieved between the periphery of the roll 130 and the running web 117 as above described are maintained by the belt drive 129, the belts of which run synchronously with the belts 112, even when the tape 147 is completely drawn off the roll 130 and has separated from it. Therefore, the splice can be made at any time after these conditions have been established and can be made by manual actuation of the brushes and cutter, if desired.

After the splice is made, the control panel 132 causes the brushes 142 to be raised by their motor 143, and the roll support 161 is then swivelled farther clockwise (as seen in FIG. 8) to a position where the roll 130, now the source of the running web, comes into contact with the main web propelling belts 112 and continues to be driven synchronously by them. As soon as this occurs, the induction coupling 124 is switched off and the roll drive frame 135 is raised away from its working position to await movement of the next new roll of the preprinted web into splicing position. Furthermore the driving motor 152 and induction coupling 151 of the winding drum 150 are switched off.

For clarity of the drawing, FIG. 8 shows the main propelling belts 112 at a distance from the splicing point of web 117 much greater than is the case in actual practice, this distance being but a narrow gap in actual practice. FIG. 8 also shows the drive of the accelerating belts 129 exploded into several components for clarity, whereas the shafts 125 and 133 preferably coincide so that the driving belt 127 is unnecessary.

A splicing cycle according to the embodiment of FIG. 8 is represented graphically in FIG. 9.

At the time $t=0$ the two induction clutches 124 and 151 are energized. The ensuing acceleration of roll 130 takes place in such a manner that the circumferential speed of the roll corresponds to the speed of the running web at the time $t=a$. At the time $t=b$ the induction coupling 124 is fully energized and the roll rotating steadily at the web speed. At time $t=c$ the register control mechanism consisting of the scanners 155, 157, control panel 132, register motor 140 and differential gear mechanism 128 is activated. Now the modulation of the rate of driving the roll to bring it into register with the running web takes place. This modulation is completed by time $t=d$ and register coincidence is attained. As one example of a practical application, the time difference between the points $t=c$ and $t=d$ would correspond to approximately 20 roll revolutions. At the time $t=d$ the splicing cycle is initiated and the register control is deactivated. At the time $t=e$ the splice is completed.

The register accuracy is constantly controlled by this invention up to the time of the splice. The size of the roll has no further influence on the splicing cycle itself. A preliminary measuring of the rolls and a corresponding adjustment or setting of control angles are no longer required.

Figure 11:
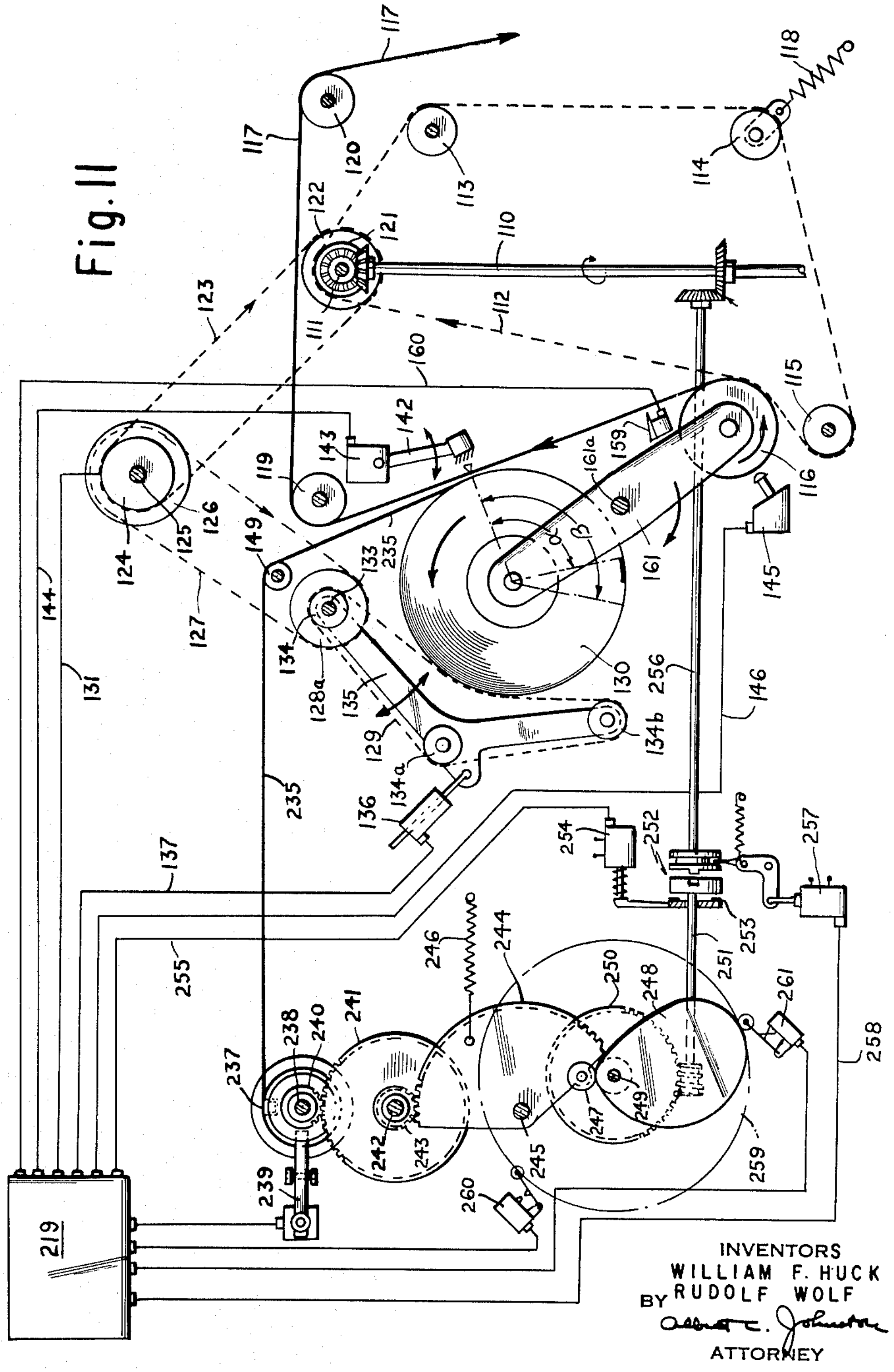
FIG. 11 is a schematic view of a further embodiment of the invention, in which the tape driving and registering elements are principally mechanical.

FIG. 11 of the drawings schematically illustrates still another embodiment of the invention, by which a phased synchronization of the position of a register mark on the new web roll to the position of register marks on the running web may be brought about mechanically at the start of the acceleration of the new roll and maintained throughout the acceleration so as to bring the roll and the web into the required condition of register when their speeds become the same.

The parts of FIG. 11 to the right hand side of the motor device 136 are substantially the same as the correspondingly numbered parts of the embodiment of FIG. 8. The only difference in them is that the register motor 140 and differential mechanism 128 and coacting scanners may be omitted in FIG. 11; in which case the auxiliary drive belts 129 are driven only by way of the induction coupling 124 from the main driving shaft 110, through a simple driven pulley 128a on shaft 133 instead of differential mechanism 128. The measuring tape in FIG. 11 is designated by numeral 235 and in this embodiment serves both to drive and to register the new roll.

The winding drum for the tape 235 is numbered 237 and is mounted on a shaft 238. A one-revolution clutch may be mounted on this shaft 238 and be operated by a switch 239 connected to the control panel 219. A drive gear 240 mounted on the shaft 238 meshes with a drive gear 241 mounted on a shaft 242, these two gears being designed to constitute a speed reduction gear drive for driving the tape winding drum 237.

The shaft 242 has a pinion gear 243 which rotates with gear 241 and meshes with a toothed segment 244 rotatable in an arc about a shaft 245. The toothed segment 244 is engaged by a spring 246 which retracts this segment into its starting position. The toothed segment 244 also carries a roller 247 which engages the periphery of a cam disc 248, and the disc is seated on a shaft 249 which carries a worm wheel 250 driven by a worm at the end of rotary drive shaft 251.

The drive shaft 251 is connected to the driven part of a clutch 242, this part of the clutch being provided with a brake 253 which serves to stop its rotation and that of the cam drive and is engaged and disengaged by an electromagnetic switch or solenoid 254 connected by a lead 255 to the control panel 219.

The driving part of the clutch 252 is connected for rotation with a power input shaft 256 and can be engaged and disengaged with the driven part of the clutch by a switching magnet or solenoid 257 connected by a lead 258 to the control panel. The input shaft 256 is coupled to the main driving shaft 110, particularly in such manner that the shaft makes exactly one rotation during the displacement of one product or register length of the running web 117. The clutch 252 is also constructed as a one-revolution clutch and is provided with a tongue or pin which causes it to engage only at one definite point or diameter of its circumference.

Switches 260 and 261 are provided in the path of rotation or orbit 259 of the cam disc 248, these switches also being connected to the control panel 219.

The apparatus according to FIG. 11 operates as follows: After the tape 235 has been fixed to and wound upon a new roll 130 and this roll has been brought to the splicing position shown, all substantially as described above, the belt drive 129 is lowered onto the roll. Just before the end of the expiring roll 116 is reached, the roll scanner 145 acting through the control panel 219 energizes the clutch 252 and deenergizes the brake 253. If the shaft 238 is provided with a clutch, this is also engaged simultaneously through the switch 239.

The point at which the clutch 252 engages to start driving the cam 248 corresponds to a definite location of a register or product length of the running web relative to the point where splicing is to occur.

The roll 130 is now accelerated through the driving action of cam 248 on roller 247, gear elements 244, 243, 241 and 240, drum 237 and tape 235. A part of the acceleration load may be placed upon the belts 129 by keeping the induction coupling 124 partially energized during the acceleration period, thus using these belts as an auxiliary drive.

The cam gear system driving the drum 237 to draw the tape 235 off the roll 130 provides a registering acceleration of the tape and roll, which takes place in a relation of phased synchronism to the rate of the displacement of patterns or register marks on the running web past the splicing point. The cam disc 248 can readily be designed so that it and the tape, hence the roll too, will have a definite position relative to a register mark on the running web at the moment when it brings the tape and the roll 130 to the speed of that web.

The achievement of register when the roll reaches the web speed can be ensured by making sure that the propelling belts 112 travel in coincidence with the running web, so that register marks on the latter move in phase with rotations of the input shaft 256, and that the clutch 252 engages in registered relation to a mark on the running web, so that the acceleration of the tape and roll begins either at a register mark or at a predetermined position within a register length of the running web. The definite locking position of the clutch 252 can be located at any desired point about the clutch circumference to secure any desired positional relation of a register mark on the new roll to a register mark on the running web.

As already indicated the belt drive 129 can assist the acceleration from the very beginning; however, it can be brought into operation in the course of the accelerating process or at the end thereof. When it takes part in the acceleration, the load on the tape and the cam gear system is reduced. If it is brought into operation only when the roll reaches the web speed, the tape 235 must bear the entire acceleration load, but control of the belt drive is simpler.

When the required synchronized speed and register coincidence are reached, the cam disc 248 operates the switch 260 which then switches the induction clutch 124 to full current so that the belt drive 129 runs synchronously with the main driving shaft 110 and, after the run off of the tape 235, drives the roll 130 alone. The splicing operation may be initiated at the same time, to take place and be followed by other operations as described in reference to FIG. 8.

During further movement of the cam disc 248, the toothed segment 244 is retracted by the spring 246. Due to the clutch on the shaft 238, which has been disengaged by the switch 239, this return has no influence on the roll 130. As soon as the cam disc 248 comes again into contact with the switch 261, the clutch 252 is disengaged and the brake 253 engaged. The entire arrangement is now back to its starting position and a new splicing cycle can be started. The drum 237 with the tape 235 wound upon it may, if desired, be removed from the shaft 238 and replaced by an empty drum to receive another tape already fixed to the next new web roll.

Figure 12:
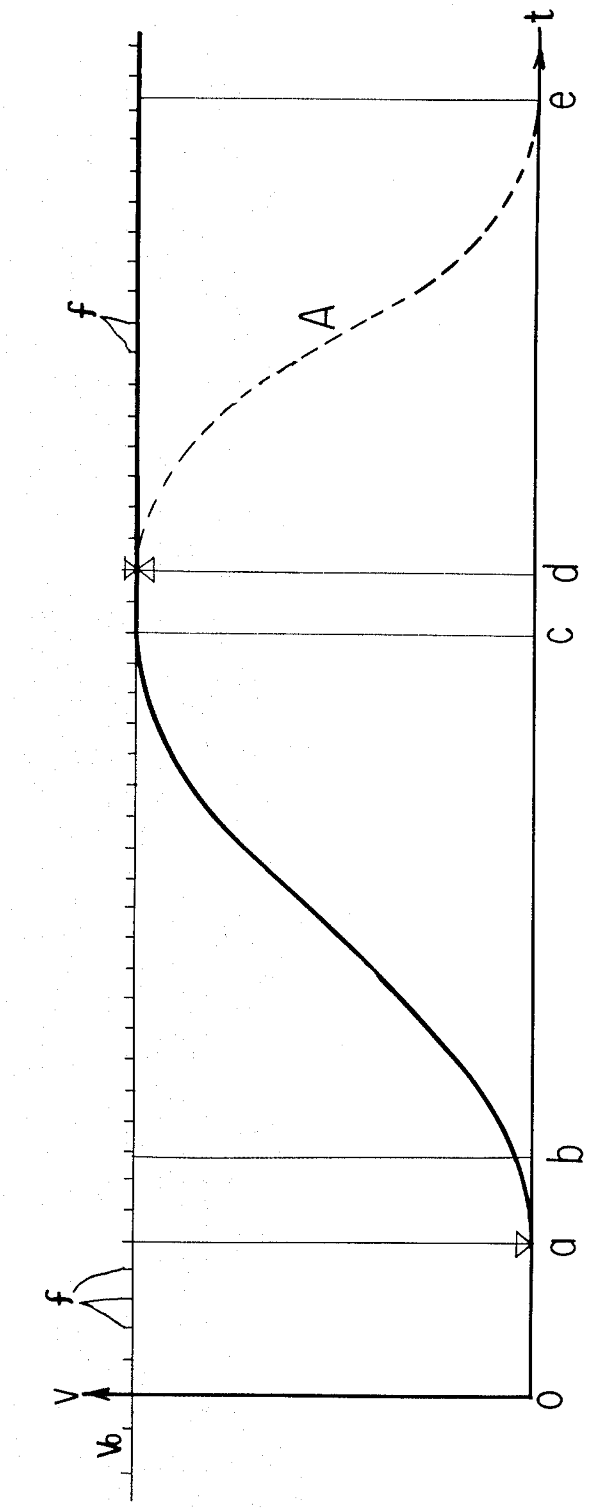
FIG. 12 is a diagram of a cycle up to register synchronization as obtained by the apparatus of FIG. 11.

FIG. 12 is a time diagram of a splicing cycle according to the described operation. Let it be assumed that the speed of the running web is $V_0$. At the time $t=a$ the switches 257 and 239 are energized by roll scanner 145 through control panel 219. Switch 239 engages the clutch of the winding drum 237 on shaft 238 while switch 257 engages clutch 252. The one-revolution shaft 256 and the one-revolution clutch 252 then effect a registering acceleration of the roll 130 through the mechanical cam gear system and the driving and registering tape 235. At the time $t=b$ the induction clutch 124 may be energized, the belt drive 129 then coming into action as an auxiliary drive for the new roll. At the time $t=c$ the cam disc 248 fully energizes the induction clutch 124 through switch 260 and initiates the splicing, so that belt drive 129 may now completely take over the driving of roll 130. At time $t=d$ the splice is accomplished at synchronous speed and register. The declining branch A of the graph shows the return of the mechanical cam gear system to its starting position. At time $t—e$ switch 257 for clutch 252 is tripped by cam disc 248 through switch 261. This clutch is then disengaged and the brake 253 is energized by switch 254.

The register marks on the running web are identified by $f$ in FIG. 12. It may be seen from the graph that the start of the acceleration is located at a register mark and that the splice also takes place at a register mark. A register "mark" as here meant may be any definitely located point on the web, whether or not it is visible or capable of activating a scanner.

It will be understood that the invention herein set forth may be embodied in various arrangements and forms of apparatus other than those particularly described hereinabove and illustrated in the drawings and that the invention is not restricted to the illustrative embodiments except as may be required by a fair construction of the appended claims.

What is claimed is:

1. The method of splicing a running length of a preprinted web in register to a roll, which comprises:

fixing in registered relation to a mark on the periphery of the roll, to a surface which upon rotation of the roll moves in proportion to the displacement of said mark, a register measuring element that moves with and in proportion to the movement of said surface;

while holding the roll and running web mutually positioned for splicing, accelerating the roll to the speed of the running web and simultaneously displacing said element by a distance and at a rate corresponding to the distance and rate of the movement of said mark so that a certain measurable displacement of said element will have occurred when said mark is moving at said speed through the location where the splicing is to occur;

in the course of the acceleration of the roll and the corresponding displacement of said element measuring said displacement and correlating the distance and the rate thereof to the location and the rate of movement of patterns on the running web so that when said mark reaches the speed of the running web it will move into said splicing location in register with a pattern on the running web;

and when said certain displacement of said measuring element has been measured splicing the running web to the periphery of the roll.

2. The method of splicing a running length of a preprinted web in register to a roll, which comprises:

fixing to the periphery of the roll, in registered relation to a mark on the periphery of the roll, a register measuring element that will drive the roll and move with and in proportion to the movement of said periphery;

while holding the roll and the running web mutually positioned for splicing, displacing said element and thereby accelerating the roll to the speed of the running web at the rate of displacement of said element so that a certain measurable displacement of said element will have occurred when said mark is moving at said speed through the location where the splicing is to occur;

in the course of the acceleration of the roll and corresponding displacement of said element measuring said displacement and correlating the distance and the rate thereof to the location and the rate of movement of patterns on the running web so that when said mark reaches the speed of the running web it will move into said splicing location in register with a pattern on the running web;

and when said certain displacement of said measuring element has been measured splicing the running web to the periphery of the roll.

3. The method of splicing a running length of a preprinted web in register to a roll, which comprises:

fixing a register measuring tape by one end thereof to the periphery of the roll in registered relation to a mark on said periphery;

winding the tape from said one end onto the roll;

while holding the roll and the running web mutually positioned at the location where the splicing is to occur, drawing the tape off the roll, simultaneously accelerating the roll to the speed of the running web at the rate of drawing off the tape, and correlating the distance and the rate of the displacement of the tape and the rate of acceleration of the roll to the location and the rate of movement of patterns on the running web so that when said mark on the roll reaches the speed of the running web it will move into said splicing location in register with a pattern on the running web;

and then splicing the running web to the periphery of the roll.

4. The method of splicing a running length of a web in register to a roll of the web, the web having register marks regularly spaced apart thereon by the same register length, which comprises:

fixing a register measuring tape by one end thereof to the periphery of the registered switch to a register mark on said periphery;

winding the tape from said one end onto the roll;

while holding the roll and the running web mutually positioned at the location where the splicing is to occur, drawing the tape off the roll at a progressively increasing rate and accelerating the roll at the rate of displacement of the tape until the roll is brought to the speed of the running web;

during the acceleration moving past a point fixed in space, at a rate corresponding to the rate of said displacement, a series of index marks spaced apart by regularly increasing distances so selected that when the roll is being accelerated so as to become in register with the running web at said speed the instants of movements of said index marks past said fixed point will coincide with the instants of movements of register marks on the running web past a fixed point in its path, scanning and comparing the respective instants of said movements, and upon a lack of coincidence of the same modulating the rate of acceleration of the tape and the roll so as to bring said respective instants into coincidence, thereby bringing said register mark on the roll into said splicing location at said speed and in register with a register mark on the running web;

and pressing and joining the running web to the periphery of the roll when the roll has reached said speed.

5. The method of claim 4, said index marks being located on the tape, the tape being fixed to the roll with the last index mark of said series located at a register length from the leading register mark of the roll and with said one end of the tape substantially coincident with the leading end of the web of the roll, said leading end havnig adhesive coated thereon to join it with the portion of the running web pressed thereto.

6. The method of splicing a running length of a web in register to a roll of the web, the web having register marks regularly spaced apart thereon by the same register length, which comprises:

fixing a register measuring tape by one end thereof to the periphery of the roll in registered relation to a register mark on said periphery, said tape having thereon near to said one end index marks spaced apart by a distance equal to said register length;

winding the tape from said one end onto the roll;

while holding the roll and the running web mutually positioned at the location where the splicing is to occur, drawing the tape off the roll and accelerating the roll to the speed of the running web at the rate of displacement of the tape;

while continuing to draw off the tape and driving the roll at said speed, scanning and comparing the instants of movements of said index marks past a point fixed in space and the instants of movements of register marks on the running web past a fixed point in its path, and upon a lack of coincidence of said respective instants of movements modulating the rate of the driving of the roll and the tape so as to bring said respective instants into coincidence, thereby bringing said register mark on the roll into said splicing location both at the speed of and in register with a register mark on the running web;

and then splicing the running web to the periphery of the roll.

7. In an apparatus for splicing a running length of a preprinted web in register to a roll, including means for propelling the running web, means for driving the roll in splicing position to and then at the speed of the running web, and means for connecting the running web to the periphery of the roll rotating at said speed, register measuring means including an element adapted to be fixed to the periphery of the roll at a definite location relative to a mark on said periphery and thereafter to be displaced with and in proportion to the driving of the roll so that a certain measurable displacement of said element will have occurred when said mark is at splicing position and moving at said speed;

means for correlating the rate of driving the roll and displacing said element to the movement of patterns on the running web so as to bring said mark on the roll into splicing position both at the speed of and in register with a pattern on the running web;

and means responsive to said certain displacement of said element for actuating said connecting means.

8. In an apparatus for splicing a running length of a preprinted web in register to a roll of the web, including means for propelling the running web, means for driving the roll in splicing position to and then at the speed of the running web, and means for connecting the running web to the periphery of the roll rotating at said speed, register measuring means including an element adapted to be fixed to the periphery of the roll at a definite location relative to a pattern on said periphery and thereafter to be displaced with and in proportion to the driving of the roll so that a certain measurable displacement of said element will have occurred when said pattern is at splicing position and moving at said speed;

means for driving said element so fixed and through it driving the roll at the same rate so that said element serves at least in part as said roll driving means; and means for correlating the rate of driving the roll and displacing said element to the movement of patterns on the running web so as to bring said pattern on the roll into splicing position both at the speed of and in register with a pattern on the running web.

9. In an apparatus for splicing a running length of a preprinted web in register to a roll of the web, including means for propelling the running web, means for driving the roll in splicing position to and then at the speed of the running web, and means for connecting the running web to the periphery of the roll rotating at said speed, register measuring means including an element adapted to be fixed to the periphery of the roll at a definite location relative to a pattern on said periphery and thereafter to be displaced with and in proportion to the driving of the roll so that a certain measurable displacement of said element will have occurred when said pattern is at splicing position and moving at said speed;

means for driving said element so fixed and through it driving the roll at the same rate so that said element serves in part as said roll driving means, said roll driving means further including a friction drive non-slipably engaging the periphery of the roll and driven in synchronism with said web propelling means and means for regulating the torque of said friction drive in correlation with the displacement of said element so as to limit the roll accelerating torque to be applied through said element; and means for correlating the rate of driving the roll and displacing said element to the movement of patterns on the running web so as to bring said pattern on the roll into splicing position both at the speed of and in register with a pattern on the running web.

10. In an apparatus for splicing a running length of a preprinted web in register to a roll of the preprinted web, including means for driving the roll in splicing position to and then at the speed of the running web and means for connecting the running web to the periphery of the roll rotating at said speed, a tape adapted to be fixed at one end to and wound upon the roll with said one end at a definite location relative to a pattern on the periphery of the roll;

means acting upon the other end of the tape for drawing the tape off the roll at the rate of the driving of the roll so that a certain measurable displacement of the tape will have occurred when said pattern is at splicing position and moving at said speed; and means for correlating the rate of drawing off the tape and driving the roll to the movement of patterns on the running web so as to bring said pattern on the roll into splicing position both at the speed of and in register with a pattern on the running web.

11. In an apparatus for splicing a running length of a web in register to a roll of the web, the web having register marks regularly spaced apart thereon, including means for driving the roll in splicing position to and then at the speed of the running web and means for connecting the running web to the periphery of the roll rotating at said speed, a tape adapted to be fixed at one end to and wound upon the roll with said one end at a definite location relative to a register mark on the periphery of the roll;

means acting upon the other end of the tape for drawing the tape off the roll at the rate of the driving of the roll so that a certain measurable displacement of the tape will have occurred when said register mark is at splicing position and moving at said speed;

indexing means positioned and moved with the tape, including a series of index marks moved successively past a scanning point as the tape is drawn off the roll, said index marks being so spaced apart that when the roll is being driven so as to be in register with the running web at said speed the movements of said index marks past said scanning point coincide with the movements of register marks on the running web past a scanning point in its path;

control means including scanners for comparing, and means for generating signals proportional to differences between, the respective instants of said movements;

means responsive to said signals for modulating the rate of drawing off the tape and driving the roll so as to bring said register mark on the roll into splicing position both at the speed of and in register with a register mark on the running web;

and means rendered operative upon said certain displacement of the tape for actuating said connecting means.

12. In an apparatus for splicing a running length of a web in register to a roll of the web, the web having register marks regularly spaced apart thereon, including means for driving the roll in splicing position at the speed of the running web and means for connecting the running web to the periphery of the roll rotating at said speed, a tape for driving and registering the roll, said tape being adapted to be fixed at one end to and wound upon the roll with said one end at a definite location relative to a register mark on the periphery of the roll;

means acting upon the other end of the tape for drawing the tape off the roll at a regularly increasing rate and thereby accelerating the roll at the rate of displacement of the tape to the speed of the running web;

Indexing means positioned and moved with the tape, including a series of index marks moved successively past a scanning point as the tape is drawn off the roll, said index marks being spaced apart by progressively increasing distances so selected that when the roll is being accelerated so as to be brought into register with the running web at said speed the movements of said index marks past said scanning point coincide with the movements of register marks on the running web past a scanning point in its path;

control means including scanners for comparing, and means for generating signals proportional to differences between, the respective instants of the movements of said index marks and said register marks past said scanning points;

means responsive to said signals for modulating the rate of drawing off the tape so as to bring said register mark on the roll into splicing position both at the speed of and in register with a register mark on the running web;

and means rendered operative when the roll is at said speed for actuating said connecting means.

13. In an apparatus for splicing a running length of a web in register to a roll of the web, the web having register marks regularly spaced apart thereon, a tape for driving and registering the roll, said tape being adapted to be fixed at one end to and wound upon the roll with said one end at a definite location relative to a register mark on the periphery of the roll;

means acting upon the other end of the tape for drawing the tape off the roll at a regulated rate and thereby driving the roll at the same rate to the speed of the running web;

and means operative upon said drawing means as it draws off the tape for correlating the rate of its action to the movement of register marks on the running web so as to bring said register mark on the roll into splicing position both at the speed of and in register with a register mark on the running web.

14. In an apparatus for splicing a running length of a web in register to a roll of the web, the web having register marks regularly spaced apart thereon, a tape for driving and registering the roll, said tape being adapted to be fixed at one end to and wound upon the roll with said one end at a definite location relative to a register mark on the periphery of the roll;

means acting upon the other end of the tape for drawing the tape off the roll at a regulated rate and thereby driving the roll at the same rate to the speed of the running web;

and scanner controlled means operative upon said drawing means as it draws off the tape for correlating the rate of its action to the movement of register marks on the running web so as to bring said register mark on the roll into splicing position both at the speed of and in register with a register mark on the running web;

the tape having thereon a series of index marks spaced apart therealong at distances regularly increasing to a spacing at said one end equal to the distance between said register marks on the web, said distances being so selected that when the roll is being accelerated so as to be brought into register with the running web at said speed the movements of said index marks past a scanning point in the path of the tape coincide with the movements of register marks on the running web past a scanning point in its path.

15. In an apparatus for splicing a running length of a web in register to a roll of the web, the web having register marks regularly spaced apart thereon, a tape for driving and registering the roll, said tape being adapted to be fixed at one end to and wound upon the roll with said one end at a definite location relative to a register mark on the periphery of the roll;

means acting upon the other end of the tape for drawing the tape off the roll at a regulated rate and thereby driving the roll at the same rate to the speed of the running web, including a winding drum having said other end fixed thereto, a hydraulic motor for driving said drum, a pump for propelling liquid to said motor, and means driven in synchronism with said drum for progressively increasing the rate of delivery of liquid from said pump to said motor;

scanning means for comparing positions respectively of the tape as it is drawn off the roll and register marks on the running web;

and control means responsive to impulses from said scanning means for modulating said rate of delivery, and thereby the rate of drawing off the tape and driving the roll, so as to bring said register mark on the roll into splicing position both at the speed of and in register with a register mark on the running web.

16. Apparatus according to claim 15, said control means including a reversible motor driven mechanism for modulating the action of said rate increasing means and a piston movable by said mechanism to displace a body of liquid communicating with the liquid flowing from said pump to said motor.

17. Apparatus according to claim 15, said motor having one port for receiving and a second port for discharging liquid delivered thereto as the motor moves in tape winding direction, and being reversible in direction by reversal of the liquid flow therethrough;

and means operable to propel liquid into said second port and thereby rotate said drum in unwinding direction so as to pay out a length of the tape for attachment to the roll.

18. Apparatus according to claim 17, and means operative as the tape fixed to the roll is wound upon the roll to supply liquid into said one port under a limited pressure causing said drum to hold the tape taut yet enabling the tape to be drawn from the drum by rotation of the roll.

19. Apparatus according to claim 18, and means for stopping movement of the tape onto the roll when a predetermined length of the tape is wound upon the roll, including an index element on the tape at a predetermined distance from said one end thereof, a brake to stop rotation of the roll, and means responsive to the arrival of said index element at a fixed point in the path of the tape for actuating said brake.

20. Apparatus according to claim 15, said drum being movable in unwinding direction to issue the tape to be fixed to and wound upon the roll in preparation for splicing;

and means for stopping movement of the tape onto the roll when a predetermined length of the tape is wound upon the roll.

21. Apparatus according to claim 15, said drum being movable in unwinding direction to issue the tape to be fixed to and wound upon the roll in preparation for splicing;

and means for stopping movement of the tape onto the roll when a predetermined length of the tape is wound upon the roll, including an index element on the tape at a predetermined distance from said one end thereof, a brake to stop rotation of the roll, and means responsive to the arrival of said index element at a fixed point in the path of the tape for actuating said brake, for activating said pump, and for limiting the liquid pressure tending to move said motor to a value causing said drum to keep the tape taut to and on the roll but insufficient to overcome the torque of said brake.

22. Apparatus according to claim 21, the running web being propelled from an expiring roll disposed near to the roll wound with the tape;

and means operative when said expiring roll has diminished to a predetermined size for inactivating said pressure limiting means and starting the action of the means for drawing the tape off the roll.

23. In an apparatus for splicing a running length of a web in register to a roll of the web, the web having register marks regularly spaced apart thereon, including means for propelling the running web and means for connecting it to the periphery of the roll when the roll is rotating at its speed, means for driving the roll to and then at the speed of the running web, including a friction drive nonslipably engaging said periphery and driven in synchronism with said propelling means through drive connections including a variable differential gear;

a tape for registering the roll, said tape being adapted to be fixed at one end to and wound upon the roll with said one end at a definite location relative to a register mark on the periphery of the roll;

means acting upon the other end of the tape as the roll is driven for drawing the tape off at the peripheral speed of the roll, including a winding drum having said other end fixed thereto and a motor to drive said drum;

scanning means for comparing positions respectively of the tape as it is drawn off the roll and register marks on the running web;

and control means responsive to impulses from said scanning means for varying the speed ratio of said differential gear, and thereby modulating the rate of driving the roll and drawing off the tape, so as to bring said register mark on the roll into splicing position both at the speed of and in register with a register mark on the running web.

24. Apparatus according to claim 23, said drive connections further including a variable torque coupling, there being means operative to vary the torque of said coupling while the roll is being accelerated, so as to regulate the rate of the acceleration, and means for fully energizing said coupling and activating said scanning means when the roll has reached the speed of the running web.

25. Apparatus according to claim 24, said motor being connected with said drum through a variable torque coupling controlled by the same means as the first-mentioned coupling.

26. Apparatus according to claim 25, each of said couplings being an induction coupling.

27. Apparatus according to claim 23, said tape having an index element thereon at a predetermined distance there along from its said one end, there being means responsive to movement of said index element through a location at a predetermined distance from said splicing position for generating a signal to actuate said web connecting means.

28. In an apparatus for splicing a running length of a preprinted web in register to a roll of the web, a tape for driving and registering the roll, said tape being adapted to be fixed at one end to and wound upon the roll with said one end at a definite location relative to a pattern on the periphery of the roll;

means acting upon the other end of the tape for drawing the tape off the roll at a progressively increasing rate and thereby accelerating the roll at the rate of displacement of the tape to the speed of the running web, said means including a winding drum having said other end fixed thereto and rotary gears operated by a rotary cam for driving said drum;

and means driven in phased synchronism with the movement of patterns on the running web for driving said cam and correlating its displacement of the tape to the position of said patterns so that said pattern on the roll is brought into splicing position both at the speed of and in register with a pattern on the running web.

29. Apparatus according to claim 28, said cam driving means including a shaft rotated with movement of the running web at the rate of one revolution for each displacement of a whole number of pattern lengths of said web, said rotary gears and cam having a range of drum driving motion corresponding to a certain number of said pattern lengths, and a coupling for connecting said shaft in non-slipping driving relation to said cam with said shaft in a predetermined angular position relative to said patterns.

30. Apparatus according to claim 29, further including an auxiliary drive for accelerating said roll, and means including a variable torque coupling for driving said auxiliary drive in synchronism with the movement of the running web.

31. Apparatus according to claim 30, said variable torque coupling being an induction coupling.

32. In an apparatus for splicing a running reprinted web in register to a roll of the web, the web having register marks regularly spaced apart thereon:

roll registering means adapted to be engaged non-slippably with the periphery of the roll at a predetermined location relative to a pattern on said periphery and then to be driven to rotate said roll while being displaced by the same distance as said periphery;

means for accelerating said registering means so engaged and thereby said periphery to the speed of the running web;

indexing means positioned and displaced with said registering means, including a series of index marks mutually spaced apart by distances regularly increasing in the direction of their accelerating travel up to a distance corresponding to the spacing of said register marks;

control means operative during the acceleration of said registering means and said indexing means to compare positions of said index marks with positions of register marks on the running web and to generate signals corresponding to deviations of said positions from a predetermined pattern-registering relationship thereof;

and means responsive to said signals for modulating the action of said accelerating means in compensation for such deviations so that when said pattern on said periphery reaches the speed of the running web it will move into the splicing location in register with a pattern on the running web.

33. Apparatus according to claim 32, said accelerating means including a rotary drive member engaging said registering means, a variable speed drive for rotating said member, said drive being driven in synchronism with the running web, and means for progressively increasing the speed of said drive as said registering means is displaced.

34. Apparatus according to claim 32, said accelerating means including a rotary drive member engaging said registering means, drive means for rotating said member, means driven in synchronism with the running web for transmitting power to said drive means, means for adjusting the power transmission so as to vary the speed of said drive means, and speed control means moved in proportion to the displacement of said registering means for moving said adjusting means so as to increase progressively the speed of said drive means.

35. Apparatus according to claim 34, said modulating means including means for varying the action of said speed control means according to the sense and the magnitude of said signals.

36. Apparatus according to claim 34, said modulating means including means operated simultaneously and according to the sense and the magnitude of said signals for varying the action of said speed control means and for displacing said drive means angularly independently of the action of said power transmitting means.

37. Apparatus according to claim 32, said accelerating means comprising a rotary drive member engaging said registering means, a rotary drive including a hydraulic motor for rotating said member, a pump for propelling liquid through said motor, means for driving said pump in synchronism with the running web, means for adjusting the flow of liquid from said pump to said motor to vary the speed of said motor, and speed control means moved in proportion to the displacement of said registering means for moving said flow adjusting means so as to increase progressively the speed of said motor;

said modulating means including a reversible correction motor moved according to the sense and the magnitude of said signals, means moved by said correction motor to vary the action of said speed control means, and means moved simultaneously by said correction motor to displace a body of liquid communicating with the liquid of said flow so as to displace said hydraulic motor angularly independently of the action of said pump.

38. Apparatus according to claim 15, further comprising an auxiliary drive for accelerating said roll to and driving it at the speed of the running web, means including a variable torque coupling for driving said auxiliary roll drive in synchronism with the movement of the running web, and means for regulating the torque of said coupling so as to limit the load borne by said tape during the acceleration of the roll.

39. Apparatus according to claim 38, said torque regulating means comprising a device movable to adjust the power output of said coupling, means rotated with said drum but movable relative thereto for positioning said adjusting device, said positioning means being movable relative to said drum in the direction to increase said power output by tension exerted by said tape on said drum, and yieldable means urging said positioning means relative to said drum in the opposite direction, so that said tension will be limited by the force of said yieldable means.

References Cited by the Examiner

UNITED STATES PATENTS

| | | | |
|---|---|---|---|
| 2,212,812 | 8/1940 | Horton | 242—58.3 |
| 2,386,346 | 10/1945 | Roesen | 242—58.3 |
| 2,536,153 | 1/1951 | Bishop | 242—58.3 |
| 2,899,143 | 8/1959 | Crosfield et al. | 242—58.3 |
| 3,042,332 | 7/1962 | Astley | 242—58.3 |

MERVIN STEIN, *Primary Examiner.*